United States Patent [19]

Geittner et al.

[11] Patent Number: 4,741,747

[45] Date of Patent: May 3, 1988

[54] METHOD OF FABRICATING OPTICAL FIBERS

[75] Inventors: Peter E. E. Geittner, Aachen, Fed. Rep. of Germany; Alfred L. M. Weling, Eupen, Belgium

[73] Assignee: U.S. Philips Corporation, New York, N.Y.

[21] Appl. No.: 806,069

[22] Filed: Dec. 6, 1985

[30] Foreign Application Priority Data

Dec. 12, 1984 [DE] Fed. Rep. of Germany ....... 3445239

[51] Int. Cl.$^4$ .................. C03B 37/025; C03C 25/02
[52] U.S. Cl. ................................. 65/3.12; 427/39; 427/163
[58] Field of Search ............ 65/3.12, 2; 427/39, 427/163, 237; 350/96.3

[56] References Cited

U.S. PATENT DOCUMENTS

| Re. 30,635 | 11/1981 | Kuppers et al. | 427/38 |
|---|---|---|---|
| 4,265,649 | 5/1981 | Achener | 65/3.12 X |
| 4,314,833 | 5/1982 | Kuppers | 65/3.12 |
| 4,486,214 | 12/1984 | Lynch et al. | 65/3.12 |

FOREIGN PATENT DOCUMENTS

| 0038982 | 11/1981 | European Pat. Off. | 65/3.12 |
|---|---|---|---|
| 2118165 | 6/1983 | United Kingdom . | |

*Primary Examiner*—Robert L. Lindsay
*Attorney, Agent, or Firm*—Jack E. Haken

[57] ABSTRACT

In the PCVD method glass layers are deposited on the inner wall of a glass tube by heating the tube to a temperature between 1100° and 1300° C., passing a reactive gas mixture at a pressure between 1 and 30 hPa through the glass tube, and moving back and forth inside the glass tube a plasma. After the glass layers are deposited, the glass tube is collapsed to produce a solid preform from which optical fibers are drawn. The regions of nonconstant deposition geometry at the ends of the preform (taper) are reduced by moving the plasma in the area of at least one reversal point nonlinearly with time and/or by changing the longitudinal extent of the plasma as a function of time. The length of the ramp is chosen to ensure an effective reduction of the end taper.

16 Claims, No Drawings

METHOD OF FABRICATING OPTICAL FIBERS

BACKGROUND OF THE INVENTION

The invention relates to a method of fabricating optical fibers. In the method, layers of glass are deposited on the inner wall of a glass tube heated to a temperature between 1100° and 1300° C. A reactive gas mixture at a pressure between 1 and 30 hPa is passed through the glass tube, while a plasma formed in the tube is moved back and forth between two reversal points. The gas reacts to form the glass layers.

After glass layers corresponding to the intended structure of the optical fiber have been deposited, the glass tube is collapsed to produce a solid preform. Optical fibers are drawn from the preform.

In this method, "glass tube" is understood to be a substrate or supporting tube consisting of doped or undoped amorphous silica (fused silica or quartz glass) either made synthetically or made by melting silica crystals.

With the above-described method, both graded index fibers and stepped index fibers can be fabricated. Quantities of glass are deposited to correspond to the required fiber structure. The fabrication of optical fibers or optical waveguides by this method is known, for example, from U.S. Pat. Nos. Re 30,635 and 4,314,833. This fabrication process is known in the art as the "nonisothermal PCVD method", the P standing for Plasma and CVD for Chemical Vapor Deposition. In this method, glass layers are deposited directly from the gas phase onto the inner wall of the glass tube (a heterogeneous reaction). This avoids the formation of glass soot, as described in more detail in U.S. Pat. No. 4,314,833.

The essential difference between the PCVD method and the MCVD method, which is also used for the fabrication of optical fibers by coating the inner wall of a tube, resides in the manner in which the chemical reactions needed for the precipitation of the glass components are activated. Whereas the MCVD method is based on thermal activation using a burner (torch), the PCVD method is based on activation by electron excitation. In the MCVD method, primarily fine particles of glass soot are produced. The uniform deposition of the glass soot in the temperature and gravitational fields is achieved by rotating the tube. To obtain compact layers, the deposited material must subsequently be sintered.

In the PCVD method, in contrast, there is no formation of fine soot-like particles. The gaseous reaction products are in molecular form and reach the inner wall of the tube, and condense there, by relatively fast diffusion. Consequently the deposition is narrowly localized and takes place uniformly over the periphery of the tube. Subsequent sintering is not necessary. As a result, in the PCVD method glass can be precipitated in both directions of the plasma movement. In the MCVD method, glass particles can only be deposited in one direction, namely in the direction of the reactive gas flow.

The economics of the two methods of fabricating optical fiber preforms depends essentially on the yields attainable with the specific fabrication processes. Basic parameters in this connection are the reproducibility of the process steps, the chemical reaction yield, the deposition rate and the optical and geometric homogeneity of the deposited material along the length of the preform.

Because of its special reaction and deposition mechanisms the PCVD method can be used to fabricate optically high grade preforms with high reproducibility, with reaction yields of almost 100%, and, compared with other methods, low end taper losses. End tapers are understood to be deposition zones at both ends of the preform where the optical and geometric properties are not sufficiently constant. The length of preform between the end tapers will be referred to as the homogeneous plateau region. Since the transport to the tube wall in the PCVD method is determined by fast, molecular diffusion mechanism, the extension of the deposition in the axial direction of the support tube by nature is small. Homogeneous plateau regions are the result of moving the reaction zones back and forth along the tube at a constant speed. The regions of nonconstant speed necessary for reversing the direction of the plasma at the ends of the preform are chosen to be as small as possible.

In the PCVD method, with deposition rates of about 0.5 g/min and preform lengths of about 70 cm, end taper losses are about 15%, implying an end taper length of about 10 cm. For practical reasons the end taper length is defined as the distance between the locations at which the mass of the deposited glass amounts to 10% and 90% of the maximum value in the plateau region.

Due to the different types of reaction and transport mechanisms in the MCVD process, and in particular due to the formation of glass soot in the homogeneous gas phase reaction, the MCVD process results in extended deposit distributions along the length of the tube and thus requires additional measures to reduce end taper losses.

A method of reducing the taper in fibers produced by the MCVD process, described in U.K. Patent Application No. 2,118,165, consists of moving the torch along the tube with a variable velocity (i.e. nonlinearly) by mechanical means. The nature of the movement depends on the specific deposition function, which in the MCVD method depends in a complex way on all deposition parameters. This function must be established experimentally by an iteration procedure for the existing special deposition conditions. In all cases, a special nonlinear form of movement along the entire deposition length is required.

Other possible ways of reducing taper, for example flow modifications or linear mechanical ramping consisting of slowing down the torch velocity at the entrance of the tube, were discussed but were found to be unfeasible or their effect was not sufficiently evaluated. The reason for this, and consequently for the above-described special measures for reducing the taper, is attributable to the following specific properties of MCVD method:

1. In the MCVD method, the particle size distribution and the behavior upon the incorporation of $SiO_2$ and dopants depend, due to the glass soot formation, in an extraordinarily complex manner on all of the process parameters. Consequently, the deposition function can be experimentally determined but not quantitatively calculated from theory.

2. As a consequence of the glass soot formation, which is connected with $SiO_2$ deposition yields under 100%, the local deposition profiles in the MCVD method are larger than the lengths of travel between reversal points. That is, the soot particles deposit on an even larger volume from the end of the tube. Consequently, to achieve reasonably constant layer thicknesses, the torch must be moved nonlinearly over the entire length of travel. A homogeneous plateau region in the real sense does not exist in the MCVD method.

3. A variation of other process parameters, such as the torch velocity, to reduce the taper has the effect, again due to the complex behavior of dopant incorporation, yield and soot particle size, of immediately, and simultaneously, changing the deposition profile or deposition function, the dopant incorporation, and the yields. Such variations are therefore difficult to control in the MCVD process and cannot be implemented without negative effects on the optical quality and homogeneity.

As may be concluded from the foregoing description of the state of the art, the PCVD method offers, as far as end taper losses are concerned, advantages which are intrinsic in the process. In the PCVD method it is unnecessary to use the elaborate and problem-causing measures adopted in the MCVD method to reduce end taper and to achieve homogeneous plateau regions in the preforms.

Nevertheless, even in the PCVD method it is desirable to achieve a further reduction of end taper losses so as to increase the process yields. If the deposition rates are increased to above 0.5 g/min, it is particularly desirable to ensure that, even under the process conditions then prevailing, the relative end taper losses remain sufficiently small (i.e. typically less than 20% of the preform length).

SUMMARY OF THE INVENTION

It is an object of the invention to reduce end taper in optical fiber preforms manufactured by the PCVD method without any negative effects on the optical quality of the preforms or on the high reaction yields.

The invention achieves this object by moving the plasma in the region of at least one reversal point nonlinearly with time and/or by changing the extent of the plasma along the length of the glass tube as a function of time. This end region is sufficiently dimensioned to guarantee an effective (further) reduction of end taper losses as compared to the end taper produced without these measures.

The method according to the invention is based essentially on the experimentally established finding that if the ramp lengths, which are kept to a minimum for mechanical reasons, for slowing down and speeding up the reaction zones at the reversal points are *made longer*, this can have the surprising effect of distinctly shortening the end taper lengths (contrary to the assumptions hitherto that the longest possible regions of constant plasma travel velocity are needed to achieve large plateau regions in the preforms). The condition for this is, of course, that the extent of the plasma and the nonlinear movement in the reversal regions are suitably adapted to the given deposition conditions.

Such nonlinear movements in the reversal regions are achieved in the PCVD method not only by appropriate modification of the mechanical movement of the resonator (i.e. of the deposition velocity profile of the reactor). Compared to other methods, the PCVD method offers a series of additional specific possibilities which are essentially based on the fact that the extent of the plasma, and hence the deposition location relative to the reactor position, can be changed in a defined manner by varying the plasma power, the gas pressure and the gas flow conditions. If this variation is performed in an appropriate way and synchronously with the resonator position in the regions of reversal, it is possible to achieve a further effective taper reduction. The measures of pressure, power and flow variation also bring about a nonlinear movement of the deposition zone over the tube length and can advantageously be applied either individually or in combination with each other.

A further surprising discovery was that the extent of the local deposition zone in the PCVD method is virtually independent of all process parameters (pressure, temperature, microwave power, tube geometry etc.). The deposition zone purely and simply linearly depends on the total gas flow through the tube to be coated. This results in the unexpected, but experimentally confirmed finding that the end taper lengths in the PCVD method grow linearly with the total gas flows without applying the method according to the invention.

The region in which the plasma travels nonlinearly and/or in which the extent of the plasma changes as a function of time corresponds preferably to 2 to 40% of the total deposition length. Shorter regions are not preferred because the taper reduction generally decreases as the regions become shorter. Moreover, for mechanical reasons the regions for slowing dow and speeding up the resonator at the reversal points should not be too short. On the other hand, longer regions above 40% of the deposition length are not necessary, because with regions under 40% the relative taper is already less than 20% of the preform length, which as a rule is sufficient to ensure a high process yield.

Additionally, for a prescribed plasma "stroke" the gas flows are preferably adjusted to correspond to the relation $$2.65 \leq \left[ \frac{Q_T}{Q_{SiCl_4}} \right] \cdot \left[ \frac{\dot{m}_{SiO_2}}{g/min} \right] \leq 7.25 \cdot \left[ \frac{Z_p}{m} \right] \qquad (1)$$

where
$Q_T$ and $Q_{SiCl_4}$ represent the total gas flow and the gas flow of SiO$_2$-forming chlorides in sccm (cubic centimeters per minute referred to standard conditions of 273K and 1013 hPa),
$\dot{m}_{SiO_2}$ is the deposition rate of SiO$_2$ in grams per minute, and
$Z_p$ is the deposition length or preform length in meters.

In the region in which equation (1) is satisfied, $Q_T$ should have the lowest possible value.

$[Q_T/Q_{SiCl_4}]$ should preferably be chosen $\geq 3$ to ensure a quantitative reaction yield. The choice of the gas flows in accordance with equation (1) ensures that the relative taper losses will remain lower than 20% of the preform length and that the flow conditions correspond to deposition rates that necessitate a taper reduction for reasons of process economy.

Further, it is advantageous to set the total gas flow to $Q_T \geq 1000$ sccm and/or the chloride gas flow to $Q_{SiCl_4} \geq 185$ sccm (corresponding to a deposition rate of $\dot{m}_{SiO_2} \geq 0.5$ g/min), because at lower flow rates or deposition rates the taper losses are as a rule already sufficiently small without use of the method proposed in the invention.

The length of the plasma stroke should preferably be less than or equal to 300 cm. Longer strokes involve considerable technical difficulties (e.g., tube deformation during coating and collapsing, increased size of the coating equipment, and more difficult handling of the preforms).

In a further embodiment of the method of the invention, the microwave generator that produces the plasma moves nonlinearly as a function of time.

Preferably the microwave resonator is slowed down or speeded up with a linear change of velocity in the region of the reversal points over a distance of $\Delta Z_R$ in accordance with the relation $$2 \cdot \left[ \frac{\dot{Q}_T}{1000 \text{ sccm}} \right] \leq \left[ \frac{\Delta Z_R}{\text{cm}} \right] \leq 4 \cdot \left[ \frac{\dot{Q}_T}{1000 \text{ sccm}} \right] \quad (2)$$

where $\dot{Q}_T$ is the total gas flow in sccm. The distance $\Delta Z_R$ is the ramp length.

In particular, the microwave resonator is slowed down or speeded up with a linear change of velocity in the region of the reversal points over a distance $\Delta Z_R$ in accordance with the relation $$2 \cdot \left[ \frac{\dot{Q}_T}{1000 \text{ sccm}} \right] \leq \left[ \frac{\Delta Z_R}{\text{cm}} \right] \leq 3 \cdot \left[ \frac{\dot{Q}_T}{1000 \text{ sccm}} \right] \quad (2a)$$

where $\dot{Q}_T$ is the total gas flow in sccm. The distance $\Delta Z_R$ is the ramp length.

In a further preferred form of the method, the extent of the plasma changes as a function of time in the regions of the reversal points.

For this purpose the power of the microwave resonator in the regions of the reversal points is preferably reduced by 10 to 50% and/or the pressure of the reactive gas mixture is preferably increased by 10 to 100%, as long as the microwave resonator is in the regions of the reversal points. This has the effect, as a consequence of the change in the extent of the plasma in the regions of the reversal points, of causing the deposition zone to move nonlinearly, thereby shortening the taper lengths in accordance with the invention.

DESCRIPTION OF THE PREFERRED EMBODIMENTS

The invention will be further explained with reference to a few examples.

In all of the examples preforms with a stepped-index profile in the core region were fabricated by the PCVD method. All deposition conditions, except for the relevant parameter for the taper reduction were kept constant. A silica glass tube (outer diameter 18 mm and inner diameter 15 mm) was used as the substrate. The resonator velocity in the plateau region, over a stroke length of 50 cm, was constant at 8 m.min$^{-1}$ at the end points, over a ramp length of 1.2 cm, the resonator velocity was constantly slowed down to zero in the forward direction and speeded up in the same form to the appropriate value in the reverse direction.

During the entire deposition the chloride flows remained constant at $\dot{Q}_{SiCl_4}=185$ sccm and $\dot{Q}_{GeCl_4}=15$ sccm, corresponding to a deposition rate of about 0.5 g.min$^{-1}$. The other PCVD parameters were also kept constant at these optimized values for the deposition rates. The substrate temperature was 1230° C., the deposition pressure about 13 hPa, and the coupled microwave power about 900 Watts. The total number of deposited layers was 825, corresponding to an effective total deposition duration of 53 minutes.

After the deposition, the preforms were collapsed and subsequently measured with a P101-preform analyzer to check core geometry and the optical refractive index difference between the deposited core material and the support tube as a function of the preform length $Z_p$. In this type of measurement, the position of the deposition relative to the center of the resonator (or the reversal points), the geometric mass distribution, and the optical refractive index along the preform can be determined simultaneously.

The following results and examples show essentially only the geometric end taper, or the effect of the method of the invention on the reduction of the taper region. The agreement between the calculated, expected values for the core radius with the experimentally measured core radii provided additional confirmation that the process yield under all conditions in the examples given was quantitative. In the plateau region no changes could be determined in the relative refractive index difference between core and cladding as a consequent of the method employed to reduce taper.

EXAMPLE 1

Without the use of the method to reduce taper, the PCVD deposition under the conditions described above yielded a geometric end taper with a length of about 14.5 to 15.0 cm.

During the deposition, there was a constant oxygen flow of $\dot{Q}_{O_2}=1800$ sccm. The total flow $\dot{Q}_T$ was consequently $\dot{Q}_T \approx 2000$ sccm (including chloride gas flows), and the $O_2/SiCl_4$ ratio was about 9:1. A comparison of these exerimental conditions and results with the data in accordance with equation (1) of the invention shows that in this case the quantity $$\left[ \frac{\dot{Q}_T}{\dot{Q}_{SiCl_4}} \right] \cdot \left[ \frac{\dot{m}_{SiO_2}}{\text{g/min}} \right] \approx$$

5.0 which is greater than 7.25 times $\left[ \frac{Z_p}{m} \right] \approx 3.6$ and consequently equation (1) is not satisfied. With a preform length of 50 cm, these conditiions lead to relatively high taper losses amounting to about 30% of the total preform length $Z_p$.

EXAMPLE 2

(Reduced Mixing Ratio)

Under otherwise identical conditions, the oxygen flow was reduced compared to Example 1 from 1800 to 1200 sccm, i.e. the $O_2/SiCl_4$ ratio was reduced to 6:1. The taper thereby decreased from about 15 to between 9.5 and 10 cm. In this case the quantity $$\left[ \frac{\dot{Q}_T}{\dot{Q}_{SiCl_4}} \right] \cdot \left[ \frac{\dot{m}_{SiO_2}}{\text{g/min}} \right] \approx 3$$

satisfies equation (1). The taper loss thus amounts to no more than 20% of the preform length. The reduction of the taper length in this case is, to a first approximation, directly proportional to the reduction of the total gas flow. In the context of equation (1) the total gas flow should therefore be given the lowest possible value.

EXAMPLE 3

(Increased Ramp Length)

Increasing the ramp length from the previous 1.2 cm to 3.2 cm, while keeping the slowing down and speeding up of the resonator at the same constant value over this increased length, brought about a further reduction of the taper to about 5.0 cm. In this case the other deposition conditions corresponded to those in Example 2. The length of the ramp was specified to satisfy equation (2), which, compared with Example 1, resulted in a taper of no more than about 10% of the preform length.

EXAMPLE 4

(Variation of Microwave Power)

Under the conditions of Example 3, the microwave power in the regions of the ramp lengths was reduced synchronously with the resonator movement from its maximum value in the plateau region to about 80% of this value at the reversal point. This resulted in a further reduction of the taper length to about 3 cm (i.e. to about 6% of the preform length $Z_p$).

The Examples given about demonstrate the effectiveness of the method according to the invention for achieving effective reduction of the taper in the PCVD process. The use of this method made it possible to reduce the taper from its previous value of 15 cm to about 3 cm (i.e. a reduction of about 80%).

What is claimed is:

1. A method of manufacturing an optical fiber, said method comprising the steps of:
    providing a glass tube having an inner wall;
    heating the tube to a temperature between 1100° and 1300° C.;
    passing a reactive glass-forming gas mixture at a pressure between 1 and 30 hPa through the tube;
    moving a nonisotherml plasma back and forth in the tube between two reversal points to react the gas mixture to deposit glass layers on the inner wall of the glass tube without the formation of glass soot;
    collapsing the tube with the glass layers to produce a solid preform; and
    drawing the solid preform into an optical fiber;
    characterized in that:
    the plasma extends along part of the length of the tube; and
    in an end region adjacent a reversal point, the extent of the plasma is changed as a function of time, said region having a length sufficient to reduce end taper in the preform.

2. A method as claimed in claim 1, characterized in that the end region has a length from 2 to 40% of the distance between the reversal points.

3. A method as claimed in claim 2, characterized in that in the end region the plasma is moved nonlinearly as a function of time.

4. A method of manufacturing an optical fiber, said method comprising the steps of:
    providing a glass tube having an inner wall;
    heating the tube to a temperature between 1100° and 1300° C.;
    passing a reactive glass-forming gas mixture at a pressure between 1 and 30 hPa through the tube;
    moving a nonisothermal plasma back and forth in the tube between two reversal points to react the gas mixture to deposit glass layers on the inner wall of the glass tube without the formation of glass soot;
    collapsing the tube with the glass layers to produce a solid preform; and
    drawing the solid preform into an optical fiber;
    characterized in that:
    in a first end region adjacent a reversal point, the plasma is moved nonlinearly as a function of time, said end region having a length sufficient to reduce end taper in the preform; and
    the plasma is moved linearly as a function of time between the first end region and a second end region adjacent the other reversal point.

5. A method as claimed in claim 4, characterized in that the end region has a length from 2 to 40% of the distance between the reversal points.

6. A method as claimed in claim 5, characterized in that:
    the plasma extends along part of the length of the tube; and
    in the first end region, the extent of the plasma is changed as a function of time.

7. A method of manufacturing an optical fiber, said method comprising the steps of:
    providing a glass tube having an inner wall;
    heating the tube to a temperature between 1100° and 1300° C.;
    passing a reactive glass-forming gas mixture at a pressure between 1 and 30 hPa through the tube;
    moving a nonisothermal plasma back and forth in the tube between two reversal points to react the gas mixture to deposit glass layers on the inner wall of the glass tube without the formation of glass soot;
    collapsing the tube with the glass layers to produce a solid preform; and
    drawing the solid preform into an optical fiber;
    characterized in that:
    the plasma extends along part of the length of the tube;
    in an end region adjacent a reversal point, the plasma is moved nonlinearly as a function of time and/or the extent of the plasma is changed as a function of time, said end region having a length from 2 to 40% of the distance between the reversal points; and
    the reactive gas mixture is passed through the tube at a rate satisfying the relationship $$2.65 \leq \left[\frac{\dot{Q}_T}{\dot{Q}_{SiCl_4}}\right] \cdot \left[\frac{\dot{m}_{SiO_2}}{\text{grams/minute}}\right] \leq 7.25 \cdot \left[\frac{Z_p}{\text{meters}}\right]$$

where $\dot{Q}_T$ is the total flow of the gas mixture in cubic centimeters per minute referred to standard conditions of 273K and 1013 hPa (sccm), $\dot{Q}_{SiCl_4}$ is the flow of $SiO_2$-forming chlorides in the gas mixture in sccm, $\dot{m}_{SiO_2}$ is the deposition rate of $SiO_2$ in grams per minute, and $Z_p$ is the distance between the reversal points in meters, and where $\dot{Q}_T$ is chosen to be as small as possible while satisfying this relationship.

8. A method as claimed in claim 7, characterized in that the ratio $[\dot{Q}_T/\dot{Q}_{SiCl_4}]$ is chosen to be $\geq 3$.

9. A method as claimed in claim 7, characterized in that $\dot{Q}_T$ is $\geq 1000$ sccm.

10. A method as claimed in claim 7, characterized in that $\dot{Q}_{SiCl_4}$ is $\geq 185$ sccm, and $\dot{m}_{SiO_2} \geq 0.5$ grams per minute.

11. A method as claimed in claim 7, characterized in that $Z_p \leq 300$ centimeters.

12. A method as claimed in claim 7, characterized in that:
 the plasma is produced with a microwave generator; and
 in the end region, the plasma is moved nonlinearly as a function of time by moving the microwave generator nonlinearly as a function of time.

13. A method as claimed in claim 12, characterized in that:
 in the end region, the microwave generator has a velocity which changes linearly as a function of time; and
 the length, $\Delta Z_R$, of the end region in centimeters satisfies the relationship $$2 \cdot \left[ \frac{Q_T}{1000 \text{ sccm}} \right] \leq \left[ \frac{\Delta Z_R}{\text{centimeters}} \right] \leq 4 \cdot \left[ \frac{Q_T}{1000 \text{ sccm}} \right].$$

14. A method as claimed in claim 12, characterized in that
 in the end region, the microwave generator has a velocity which changes linearly as a function of time; and
 the length, $\Delta Z_R$, of the end region in centimeters satisfies the relationship $$2 \cdot \left[ \frac{Q_T}{1000 \text{ sccm}} \right] \leq \left[ \frac{\Delta Z_R}{\text{centimeters}} \right] \leq 3 \cdot \left[ \frac{Q_T}{1000 \text{ sccm}} \right].$$

15. A method as claimed in claim 7, characterized in that:
 the plasma is produced with a microwave generator; and
 in the end region, the extent of the plasma is changed as a function of time by reducing the power of the microwave generator by 10 to 50%.

16. A method as claimed in claim 7, characterized in that in the end region, the extent of the plasma is changed as a function of time by reducing the pressure of the reactive gas mixture by 10 to 100%.

* * * * *